United States Patent
Miyamoto et al.

(10) Patent No.: US 9,473,317 B2
(45) Date of Patent: *Oct. 18, 2016

(54) COMMUNICATION APPARATUS AND COMMUNICATION METHOD

(71) Applicant: Kabushiki Kaisha Toshiba, Minato-ku (JP)

(72) Inventors: Arata Miyamoto, Ota-ku (JP); Kenichi Maeda, Kamakura (JP); Masahiro Ishiyama, Kawasaki (JP); Hiroto Nakai, Yokohama (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 309 days.

This patent is subject to a terminal disclaimer.

(21) Appl. No.: 14/200,494

(22) Filed: Mar. 7, 2014

(65) Prior Publication Data

US 2015/0071155 A1  Mar. 12, 2015

(30) Foreign Application Priority Data

Sep. 10, 2013 (JP) ................................. 2013-187507

(51) Int. Cl.
  *H04L 12/18* (2006.01)
  *H04W 76/02* (2009.01)
  (Continued)

(52) U.S. Cl.
  CPC .......... *H04L 12/189* (2013.01); *H04L 12/1868* (2013.01); *H04W 4/14* (2013.01); *H04W 28/06* (2013.01); *H04W 40/14* (2013.01);
  (Continued)

(58) Field of Classification Search
  CPC ..... H04L 45/42; H04L 45/124; H04L 45/22; H04L 45/24; H04L 12/189; H04L 45/04; H04L 45/121; H04L 45/125; H04L 45/28; H04W 52/243; H04W 52/48; H04W 52/38
  USPC ........................................... 370/312
  See application file for complete search history.

(56) References Cited

U.S. PATENT DOCUMENTS 8,924,807 B2  12/2014  Wentink
2002/0037736 A1  3/2002  Kawaguchi et al.
(Continued)

FOREIGN PATENT DOCUMENTS

JP  2-101841  4/1990
JP  6-6363  1/1994
(Continued)

OTHER PUBLICATIONS

Office Action issued on Dec. 8, 2015 in Japanese Patent Application No. 2013-187507 with English translation.

*Primary Examiner* — Jae Y Lee
*Assistant Examiner* — Jean F Voltaire
(74) *Attorney, Agent, or Firm* — Oblon, McClelland, Maier & Neustadt, L.L.P.

(57) ABSTRACT

According to the embodiments, a communication apparatus stores therein an operation mode indicating whether the communication apparatus is a publisher or a subscriber, and includes a message processing unit that generates a transmission message and analyzes a reception message and a nonvolatile memory. When the communication apparatus is subscriber, the communication apparatus sends a repair message to request a retransmission of a data chunk not successively received. When the communication apparatus is publisher, the communication apparatus selectively retransmits the data chunk based on the repair message.

22 Claims, 9 Drawing Sheets

(51) Int. Cl.
  *H04W 28/06*    (2009.01)
  *H04W 4/14*     (2009.01)
  *H04W 40/14*    (2009.01)
  *H04W 84/12*    (2009.01)
  *H04W 74/04*    (2009.01)
  *H04W 36/14*    (2009.01)

(52) U.S. Cl.
  CPC ........... *H04W76/023* (2013.01); *H04W 84/12* (2013.01); *H04W 36/14* (2013.01); *H04W 74/04* (2013.01)

(56) References Cited

U.S. PATENT DOCUMENTS

| | | | |
|---|---|---|---|
| 2002/0090008 A1* | 7/2002 | Cioffi | H04L 7/0008 370/503 |
| 2005/0138019 A1* | 6/2005 | Betts | H04L 45/00 |
| 2007/0258466 A1 | 11/2007 | Kakani | |
| 2009/0323697 A1* | 12/2009 | Celentano | H04W 28/06 370/395.42 |
| 2012/0322502 A1* | 12/2012 | Song | H04W 36/14 455/553.1 |
| 2013/0077477 A1* | 3/2013 | Daraiseh | H04W 40/14 370/225 |
| 2013/0172035 A1 | 7/2013 | Wentink | |
| 2014/0031063 A1* | 1/2014 | Park | H04W 4/005 455/456.1 |
| 2014/0036898 A1* | 2/2014 | Liu | H04W 76/023 370/338 |
| 2014/0269437 A1* | 9/2014 | Kotecha | H04W 4/06 370/259 |

FOREIGN PATENT DOCUMENTS

| | | |
|---|---|---|
| JP | 6-177898 | 6/1994 |
| JP | 11-275106 A | 10/1999 |
| JP | 2002-111679 A | 4/2002 |
| JP | 2002-169738 A | 6/2002 |
| WO | WO 2013/101607 A1 | 7/2013 |

* cited by examiner

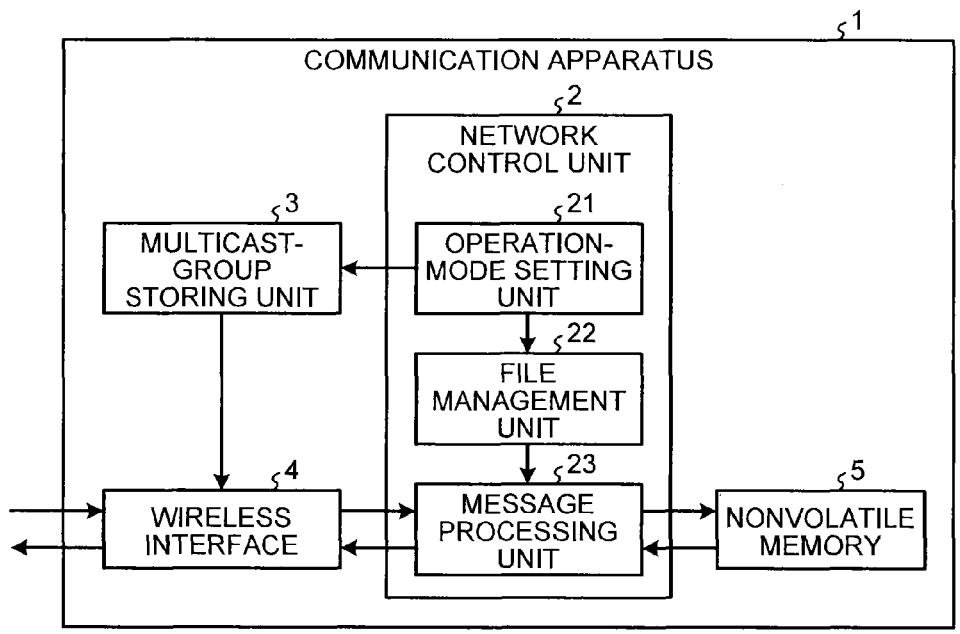

COMMUNICATION APPARATUS AND COMMUNICATION METHOD

CROSS-REFERENCE TO RELATED APPLICATIONS

This application is based upon and claims the benefit of priority from the prior Japanese Patent Application No. 2013-187507, filed on Sep. 10, 2013; the entire contents of which are incorporated herein by reference.

FIELD

Embodiments described herein relate generally to a communication apparatus and a communication method.

BACKGROUND

As a communication method in wireless communication, there is a Peer-to-Peer (P2P) communication method in which data is directly transmitted and received between terminals without via any access points. Because any communication infrastructure is not required for P2P communication, the method can be used in any location and the communication channel can be minimized, thereby leading to reduction of the latency of the communication. Furthermore, when terminals are proximate to each other, communication can be made with small power consumption using a communication signal with a small output.

In wireless communication, there is a case where a transmission terminal transmits the same data to a plurality of reception terminals. When the transmission terminal transmits data to each of the reception terminals, the data transmission takes a certain length of time and a certain amount of power is consumed. Meanwhile, when data is transmitted simultaneously by multicast, because delivery confirmation of the data is not made by the multicast, there is a possibility of missing data in the reception terminals.

BRIEF DESCRIPTION OF THE DRAWINGS

FIG. 1 is a block diagram illustrating a configuration example of a communication apparatus according to a first embodiment;

FIG. 2 is a diagram illustrating a configuration example of a data message according to the first embodiment;

FIG. 3 is a diagram illustrating a configuration example of a repair message according to the first embodiment;

DETAILED DESCRIPTION

Figure 4:
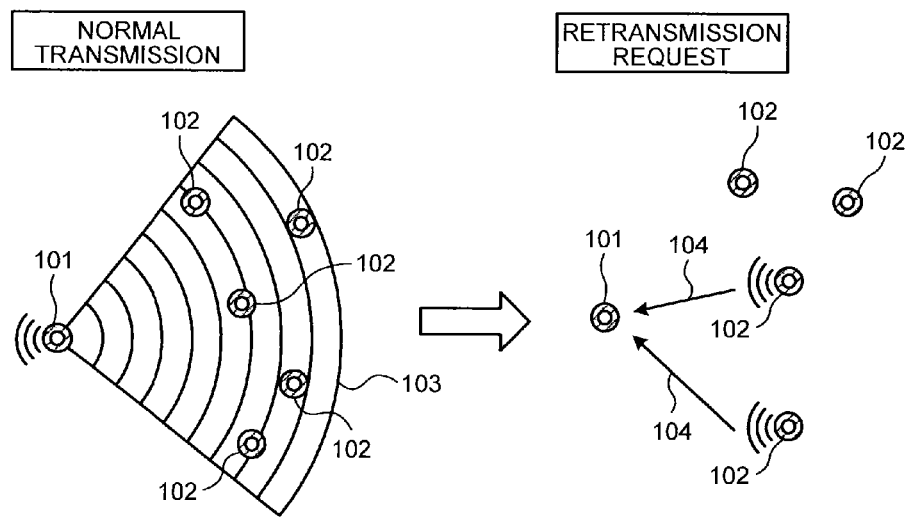
FIG. 4 is a diagram illustrating an example of message transmission in the first embodiment.

In general, according to one embodiment, a communication apparatus includes a wireless interface unit, an operation-mode storing unit that stores therein whether it is a mode in which the communication apparatus operates as a publisher or a mode in which the communication apparatus operates as a subscriber, an identification-information storing unit that stores therein a first identifier indicating that the communication apparatus belongs to a first group, a message processing unit that generates a message to be transmitted and analyzes a message to be received, and a nonvolatile memory. When the communication apparatus is a publisher, a transmission message including the first identifier is output by the wireless interface unit to outside of the communication apparatus, and when the communication apparatus is a subscriber, it is determined whether the first identifier is included in a reception message received by the wireless interface unit, and in a case where the first identifier is included in the reception message, data is stored in the nonvolatile memory, and in a case where the first identifier is not included in the reception message, the data is not stored in the nonvolatile memory.

Exemplary embodiments of a communication apparatus and a communication method will be explained below in detail with reference to the accompanying drawings. The present invention is not limited to the following embodiments.

(First Embodiment)

FIG. 1 is a block diagram illustrating a configuration example of a communication apparatus 1 according to a first embodiment. The communication apparatus 1 includes a network control unit 2, a multicast-group storing unit 3 (identification-information storing unit), a wireless interface 4, and a nonvolatile memory 5.

The communication apparatus 1 according to the first embodiment can transmit and receive data with another communication apparatus 1 with an identical configuration by P2P communication. The communication apparatus 1 can also perform unicast communication with another communication apparatus 1, and can transmit the same data to a plurality of other communication apparatuses 1 by multicast.

The wireless interface 4 performs a reception process of a wireless signal, and when a received signal is a message to the interface itself, the wireless interface 4 outputs the message to the network control unit 2. Furthermore, the wireless interface 4 transmits a message generated by the network control unit 2 as a wireless signal. Further, the wireless interface 4 performs a transfer process for realizing P2P communication by a plurality of communication apparatuses 1. While there is no restriction on a protocol and the like for realizing the P2P communication, for example, an IP (Internet Protocol) can be used.

The multicast-group storing unit 3 holds a list of identifiers of a multicast group to which the unit itself belongs. The multicast-group storing unit 3 notifies identifiers of the multicast group to which the unit itself belongs to the wireless interface 4. The wireless interface 4 determines that a message in which a multicast address corresponding to an identifier of the multicast group to which the interface itself belongs is stored in a destination is also a message to the interface itself. The nonvolatile memory 5 holds data to be transmitted, received data, and the like. The network control unit 2 includes an operation-mode setting unit 21, a file management unit 22, and a message processing unit 23.

Conventionally, transmission and reception of data between mobile devices such as smartphones and tablets routinely occur in exchanges of media files such as photographs and moving images. In transmission and reception of data between mobile devices, there is a method of using an infrastructure mode of WiFi® or communication means that requires an access point (or a base station) such as a cellular network. In this case, even when communication is to be made between devices that are spatially approximate to each other, data from a transmission source device reaches a transmission destination device as the data once passes through an access point. This process causes an increase of the latency of communication due to the presence of a redundant communication channel, and, in the first place, data communication between terminals in the method cannot be made without the presence of an access point. Furthermore, when the distance from a terminal to an access point is long, power consumption is increased because a high-output wireless signal needs to be transmitted.

In exchanges of data between mobile devices, there is a case where the same data is transmitted to a plurality of terminals. In this case, a one-to-many data movement occurs. If communication efficiency is not considered, it is conceivable that one-to-one communication is repeated by the number of reception terminals. However, repetitive transmission of the same data leads to redundancy and an increase of the time required for the data transfer, and a frequency range will be unnecessarily occupied for a long time.

To avoid this disadvantage, it suffices to use one-to-many multicast communication instead of one-to-one unicast communication. However, in the case of multicast communication, when a reception terminal misses a fragment of certain data, it is not possible to retransmit the data for the reception terminal while data transfer from the transmission terminal is interrupted. Digital television broadcast, IP broadcast, and the like do not have a mechanism of data retransmission, because media data of these types of broadcast has a data structure such that its transmission process is not disrupted if a certain data area of the media data is missing. When handling of data with an arbitrary format is considered, even one bit of its reception file cannot be missed. Therefore, in the first embodiment, a retransmission process of data is performed in order to prevent missing of data at the reception side while transmission of data is continued by multicast communication.

In the first embodiment, when the same data is transmitted to a plurality of other communication apparatuses 1, transmission and reception of data are managed by multicast groups. The multicast groups belong to the same logical network and are an assembly of the communication apparatuses 1, which are in a relationship of transmitting and receiving data with each other. In the first embodiment, the logical network includes a plurality of communication apparatuses having identifiers of the same multicast. That is, among communication apparatuses having identifiers of the same multicast, transmission and reception of data to be distributed within multicast groups are performed, and among communication apparatuses not having identifiers of the same multicast, transmission and reception of data to be distributed within multicast groups are not performed even if these communication apparatuses are located in a short distance in a physical sense. In the first embodiment, when the same data is transmitted to a plurality of other communication apparatuses 1, a communication apparatus 1 that serves as a data transmission source, that is, a transmission source apparatus, is referred to as "publisher (transmission source)", and communication apparatuses 1 other than the publisher are referred to as "subscriber (reception side)". The subscriber receives data from the publisher directly or via another communication apparatus 1. One communication apparatus 1 that serves as a publisher is set for one multicast group.

The operation-mode setting unit 21 (operation-mode storing unit) of the network control unit 2 sets whether the apparatus itself (the communication apparatus 1) operates in a publisher mode or a subscriber mode. The operation-mode setting unit 21 also sets multicast groups to which the apparatus itself belongs. The setting of multicast groups is explained later. The operation mode can be set individually for each of the multicast groups. For example, it is possible to set such that one communication apparatus 1 serves as a publisher in a certain multicast group and also severs as a subscriber in other multicast groups. The operation-mode setting unit 21 controls the file management unit 22 and the message processing unit 23 such that these units perform operations corresponding to the operation mode of each of the multicast groups.

When the communication apparatus 1 operates as a publisher, the file management unit 22 generates a ToC (Table of Contents) (contents information) of a file group, which is a transmitting item to subscribers. In the first embodiment, a chunk of data to be transmitted from a publisher to subscribers is referred to as "file". The file can be any type of data file. For example, it can be a text file, or an image or picture data file. The publisher transmits one or more files by a series of messages. The file management unit 22 generates a ToC having stored therein information related to files corresponding to the series of messages before transmitting the series of messages. Furthermore, the file management unit 22 decomposes a file into pieces of unit data used at retransmission, where each of the pieces of unit data is referred to as "chunk (data chunk)", and a unique identifier is allocated to each chunk. In the ToC, identifiers of files and a list of chunks constituting the files are included on a file-by-file basis. The list of chunks constituting these files is, for example, a list of identifiers of chunks. The first embodiment is not limited thereto and, when an identifier of a series of chunks is allocated to one file, the list of chunks constituting the file (hereinafter, "chunk list") can be, for example, information indicating an area of the identifier of chunks to be transmitted. The message processing unit 23 generates a message having stored therein a ToC (a ToC message). The wireless interface 4 transmits the ToC message as a wireless signal.

When the communication apparatus 1 operates as a subscriber, the file management unit 22 holds a chunk list having been notified from a ToC.

The message processing unit 23 generates a message in which data to be transmitted to other communication apparatuses 1 is formed in a certain format, and transmits the message to the wireless interface 4. The wireless interface 4 then receives the message that is received from other communication apparatuses 1, and a process corresponding to the contents of the message is performed.

When the communication apparatus 1 operates as a publisher, the message processing unit 23 generates a data message having stored therein data (data constituting a file)

held in the nonvolatile memory 5. Furthermore, when the communication apparatus 1 operates as a publisher, the message processing unit 23 performs a retransmission process (explained later) based on a repair message (explained later) received from a subscriber. In the first embodiment, while an example in which a publisher transmits data held in the nonvolatile memory 5 to a subscriber is explained, this embodiment can be also applicable to a case of transmitting data received via a wired or wireless line or data stored in other external storage media.

When the communication apparatus 1 operates as a subscriber, the message processing unit 23 extracts data from a data message received from another communication apparatus 1, and stores the extracted data in the nonvolatile memory 5. When a message processing unit 23a has received a ToC, the message processing unit 23 holds a chunk list stored in the ToC. Furthermore, when the communication apparatus 1 operates as a subscriber, if there is a data message having failed to be received, the message processing unit 23 generates a repair message and passes the message to the wireless interface 4.

The data message is a message including a chunk that is a fragment of file data to be transmitted from a publisher to subscribers. One or more chunks are included in one data message. One chunk includes a byte stream that is an entity of the chunk and an identifier of the chunk. In addition to these elements, other pieces of information can be also included in the chunk.

When the size of the chunk is too large to be transmitted as one data message, the chunk can be divided into even smaller pieces of unit data, which are referred to as "sector". In this case, while the data message is transmitted in the unit of sectors, a request of retransmission is made in the unit of chunks. In this case, the data message includes one or more sectors. The sector includes a byte stream that is an entity of the sector and an identifier of the sector. The identifier of the sector is formed by a pair of an identifier of a chunk that includes the sector and an index from the top on the chunk of the sector. Similarly to file messages, the publisher decomposes a ToC into chunks or sectors and transmits the chunks or sectors as data messages.

FIG. 2 is a diagram illustrating a configuration example of a data message according to the first embodiment. FIG. 2 illustrates an example of transmitting a data message in the unit of chunks. As shown in FIG. 2, a transmission-source publisher identifier as information indicating a transmission source is stored in the data message and a transmission-destination multicast group identifier as information indicating a destination is also stored in the data message. Next, a chunk number indicating the number of chunks to be transmitted in the data message is stored, and then respective chunks (chunk 1, chunk 2, and the like) are stored. When the data message is transmitted in the unit of sectors, the chunk number shown in FIG. 2 is replaced by a sector number, and respective sectors are stored in the data message instead of respective chunks.

A repair message is a message transmitted from a subscriber to a publisher. The repair message is used by the subscriber to instruct the publisher as to which chunk is requested to transmit (to retransmit). The repair message includes a chunk identifier of a chunk for which the subscriber requests retransmission. When the publisher receives a repair message, as a retransmission process, a chunk corresponding to the chunk identifier included in the repair message is transmitted at a certain timing.

FIG. 3 is a diagram illustrating a configuration example of a repair message according to the first embodiment. The repair message includes a list of identifiers of chunks supposed to be transmitted. As shown in FIG. 3, a transmission-source subscriber identifier as information indicating a transmission source is stored in the repair message and a transmission-destination publisher identifier as information indicating a destination is also stored in the repair message. Next, a chunk identifier number indicating the number of identifiers of chunks that are requested to be transmitted by the repair message is stored, and then identifiers of respective chunks requested to be transmitted are stored. To reduce the amount of data of chunk identifiers designated in the repair message, the data can be compressed by a method such as representing consecutive chunk identifiers included in the same file as a pair of an identifier of the top chunk and the number of consecutive chunks.

The multicast group according to the first embodiment is explained next. In the first embodiment, a publisher transmits a data message by multicast, and all apparatuses within a reachable area receive the data message. The publisher and a corresponding subscriber do not always sense each other's presence, and thus it is not necessary to establish an explicit connection between them. When a normal message is transmitted by multicast, a transmission-source apparatus does not guarantee that the message is correctly delivered to a reception-side apparatus, and does not confirm whether the message has been delivered to the reception-side apparatus. On the other hand, in the first embodiment, when reception of a data message has failed, a retransmission process is performed using a repair message. By performing the retransmission process, even when data is transmitted by multicast, it is possible to prevent missing of data at the reception side.

FIG. 4 is a diagram illustrating an example of message transmission in the first embodiment. The normal transmission on the left side of FIG. 4 represents a state where a publisher 101 transmits a data message by multicast. A subscriber 102 positioned within a reachable area 103 of a radio wave from the publisher 101 can receive the data message. The retransmission request on the right side of FIG. 4 represents a state where the subscriber 102 requests retransmission of a data message by a repair message 104. The radio wave output from the publisher 101 or the subscriber 102 can be either a radio wave having directionality or that without directionality. When the radio wave does not have directionality, in FIG. 4, the radio wave output from the publisher 101 or the subscriber 102 propagates in a concentric manner.

As an example of transmitting a data message by multicast, there is a method of using IP multicast. A common multicast address is allocated to a publisher and all subscribers participating in the same multicast group. In this case, as the multicast group identifier shown in FIG. 2, a multicast address can be used. When a message is transmitted to the multicast address, the message is delivered to all the apparatuses in the same multicast group. Meanwhile, even when there are apparatuses participating in a different multicast group, because a mutually different multicast address is allocated to these groups, there is no possibility that each other's message is wrongly delivered.

Figure 5:
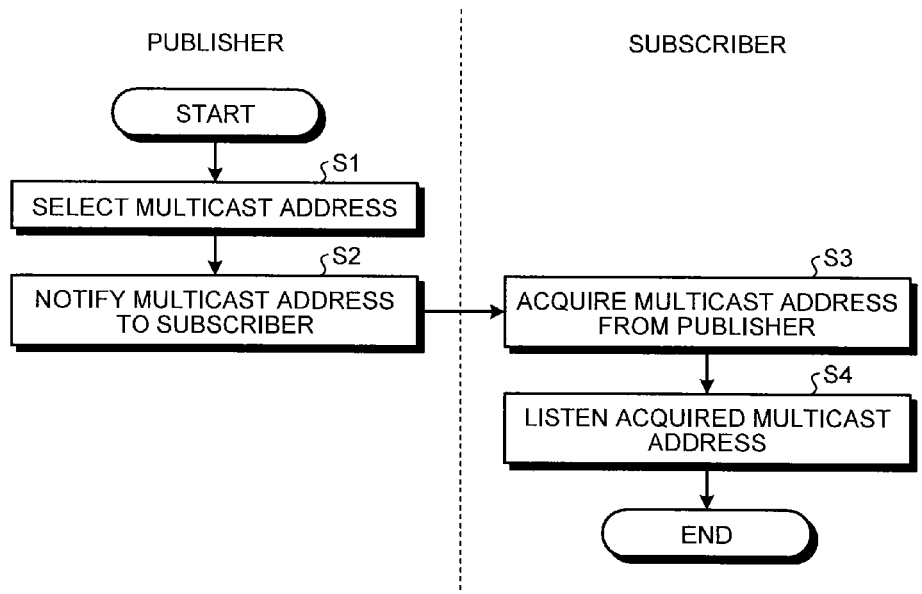
FIG. 5 is a diagram illustrating an example of a participation process procedure in a multicast group.

FIG. 5 is a diagram illustrating an example of a participation process procedure in a multicast group. When a new multicast group is created, a publisher first selects a multicast address (Step S1). The selection of the multicast address is performed by the multicast-group storing unit 3. The multicast address is used as the identifier of a multicast group for receiving a file that is transmitted by the unit itself. Next, the publisher notifies the multicast address to apparatuses around the publisher with a certain method (Step S2). For example, as the certain method, it is possible to use a method in which all communication apparatuses 1 that can participate in the multicast group are connected in advance to a network space having a common network address, and the multicast address is notified to the network address by broadcast. Furthermore, it is also possible to use a physical approach without depending on a network, such as that a manager of the publisher of the multicast address orally notifies the multicast address to a user of a subscriber. In addition, it suffices that the publisher does not decide the multicast address, but an operator decides the multicast address and sets the decided address to the publisher, or that the operator notifies the multicast address to a user by a paper sheet, an electronic mail, and the like.

As the subscriber acquires the multicast address by an input from a user and the like or reception from the publisher (Step S3), when the subscriber receives a file from the publisher of the multicast group, by setting the multicast address, "listen (reception of data transmitted within a multicast group)" is started (Step S4). Specifically, the multicast-group storing unit 3 of the subscriber holds the multicast address. Furthermore, the multicast-group storing unit 3 of the publisher holds a decided or set multicast address.

When the communication apparatus 1 includes a plurality of wireless interfaces 4, one communication apparatus 1 can participate in a plurality of multicast groups simultaneously. In this case, a mutually different multicast address is set to each of the wireless interfaces 4.

Figure 6:
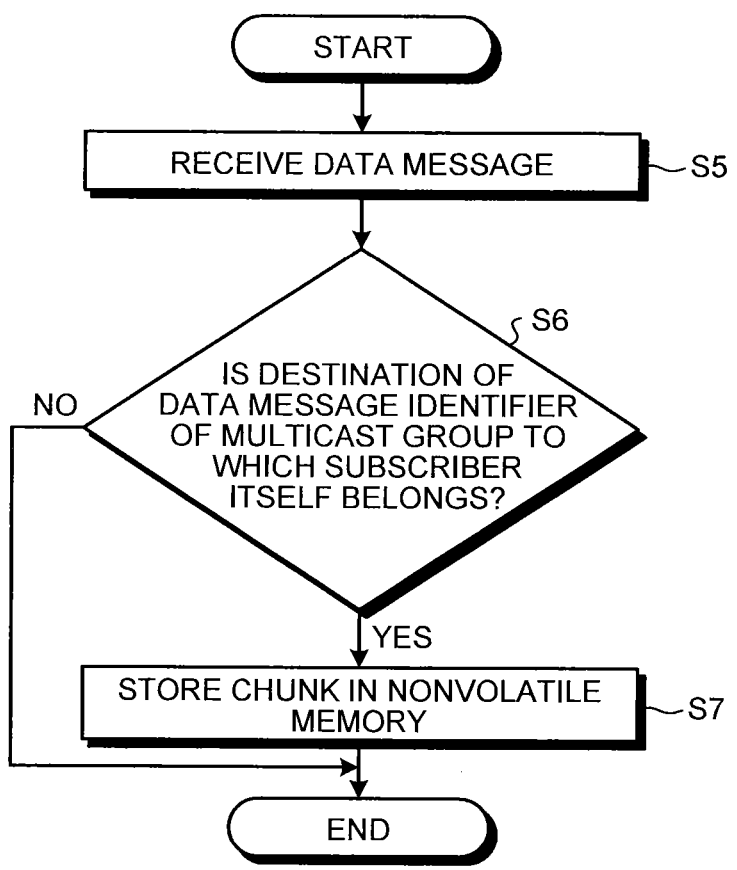
FIG. 6 is a flowchart illustrating an example of an operation of a subscriber that has received a data message.

An operation of a subscriber when it has received a data message from a publisher is explained. FIG. 6 is a flowchart illustrating an example of an operation of a subscriber that has received a data message. When a subscriber receives a data message (Step S5), it is determined whether the destination of the data message is the identifier of a multicast group to which the subscriber itself belongs (Step S6). When the destination of the data message is the identifier of the multicast group to which the subscriber itself belongs (Yes at Step S6), the data message (specifically, a chunk stored in the data message) is stored in the nonvolatile memory 5 (Step S7) and the process is ended. At Step S7, there is a case where the data message is not stored in the nonvolatile memory 5, and a chunk included in the data message is extracted on a RAM (not shown) and a predetermined process is performed on the extracted chunk. When the destination of the data message is not the identifier of the multicast group to which the subscriber itself belongs (No at Step S6), the data message is not stored in the nonvolatile memory 6 and the process is ended.

Figure 7:
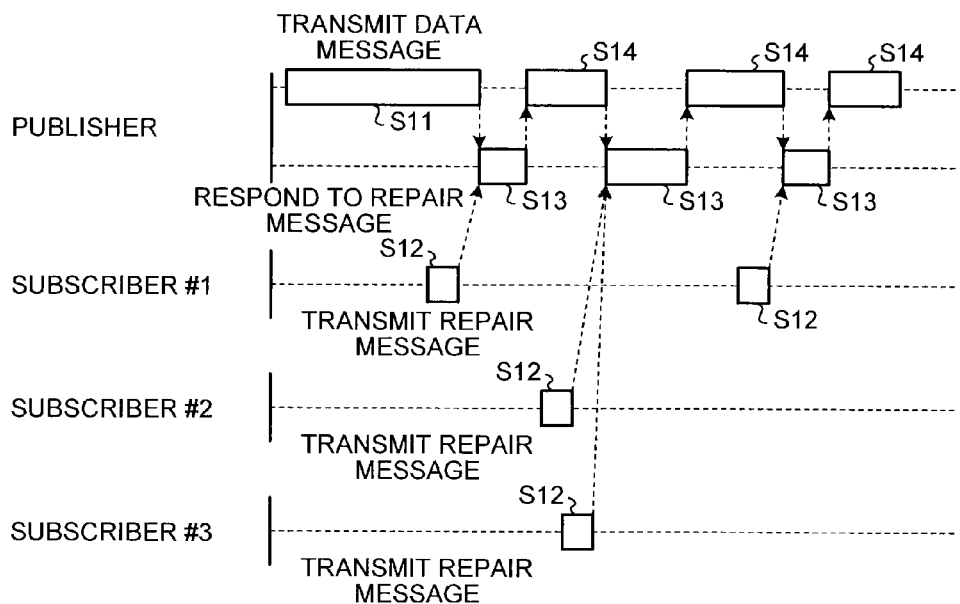
FIG. 7 is a diagram illustrating an example of a data-message transmission sequence in a loop transmission state in the first embodiment.

Next, a data-message transmission sequence of a publisher is explained. FIG. 7 is a diagram illustrating an example of a data-message transmission sequence in a loop transmission state in the first embodiment. For the sake of simplicity, it is assumed here that any new subscriber does not participate in a multicast group during processing. First, a publisher sequentially transmits a ToC and a series of data messages (Step S11). As described above, the series of data messages are data messages to which file information is notified by a ToC, and are a plurality of data messages in which data (chunks) of one or more files are stored. Specifically, the file management unit 22 determines a transmission order of chunks to be transmitted and instructs the transmission order from the top chunk to the tail chunk to the message processing unit 23. The message processing unit 23 sequentially generates a data message having stored therein one or more chunks based on the transmission order. The wireless interface 4 transmits the generated data message. The state described above, that is, a publisher transmits chunks corresponding to one ToC as a data message sequentially from the top chunk to the tail chunk, is referred to as "loop transmission state".

On the other hand, as the subscriber receives a data message transmitted from the publisher and when there is a chunk having failed to be received, a repair message is transmitted (Step S12). Specifically, the file management unit 22 of the subscriber compares a chunk list notified from a ToC and a chunk identifier of a chunk that has been received normally to determine whether there is any chunk that has not been received normally. When there is a chunk that has not been received normally, the identifier of the chunk is notified to the message processing unit 23, and the message processing unit 23 generates a repair message having stored therein the notified chunk identifier. The wireless interface 4 transmits the generated repair message.

As the publisher receives the repair message in the loop transmission state, the publisher temporarily stops an operation of sequentially transmitting chunks and responds to the repair message (Step S13). Specifically, the publisher transmits a chunk corresponding to an identifier of a chunk included in the repair message by a data message. The publisher resumes temporarily stopped transmission of a series of data messages after responding to the repair message (Step S14). In this manner, temporary stopping of transmission of the series of data messages and responding to the repair message (Step S13) and resuming of the transmission (Step S14) are repeated while corresponding to the transmission of the repair message (Step S12).

Figure 8:
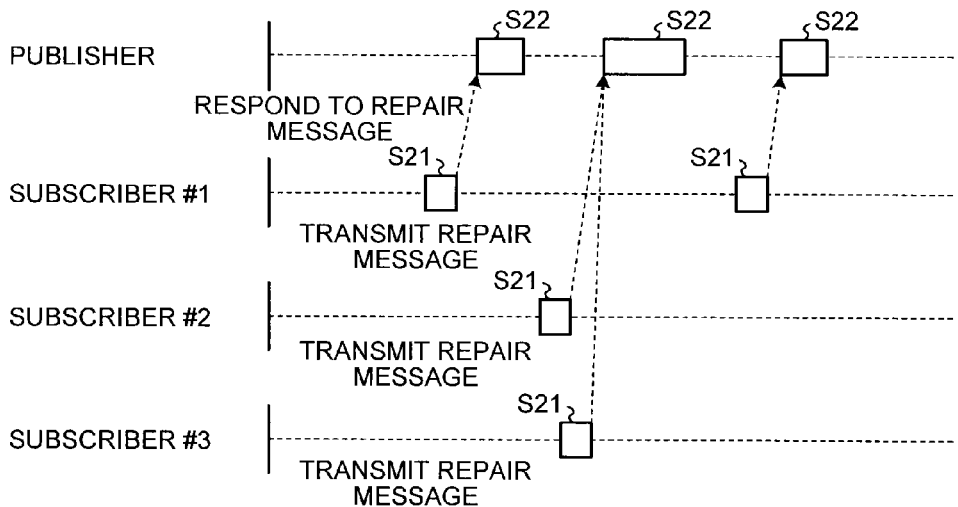
FIG. 8 is a diagram illustrating an example of a data-message transmission sequence in a repair reception state in the first embodiment.

After transmitting the tail chunk in the series of data messages, the state of the publisher shifts from the loop transmission state to a repair reception state. FIG. 8 is a diagram illustrating an example of a data-message transmission sequence in a repair reception state in the first embodiment. In the repair reception state, upon reception of a repair message, the publisher performs an operation for responding to the repair message. When there is a chunk having failed to be received, a subscriber transmits a repair message (Step S21). Upon reception of the repair message, the publisher responds to the repair message (Step S22). Specifically, the publisher transmits a chunk corresponding to an identifier of a chunk included in the repair message by a data message. At this time, the data message can be transmitted by multicast or by unicast. The publisher determines that the transmission is ended at the time when there is no delivery of any repair message for a predetermined period of time, and the repair reception state is ended.

In the above descriptions, while an example in which a data message is transmitted in the unit of chunks has been explained, when a data message is transmitted in the unit of sectors, a repair message stores therein an identifier of a chunk.

Next, an example of a method of a subscriber to determine a timing of transmitting repair messages and to determine a chunk identifier included in each of the repair messages is explained. The subscriber sorts all chunks transmitted by a publisher in the order of transmission based on information notified by a ToC. Next, when a data message including a chunk that has not been received from the publisher is not delivered for a predetermined period of time, which is based on a time when the subscriber has received a ToC, the subscriber determines that reception of the chunk has failed, and requests retransmission of the chunk by generating and transmitting a repair message. At this time, the requested chunks are designated as those while selecting unreceived chunks among all the sorted chunks by a certain number in the order from the top chunk.

As described above, in the first embodiment, a publisher transmits data in the unit of chunks or sectors by multicast, and a subscriber transmits a repair message having stored therein an identifier indicating a chunk or sector, which is determined as that having failed to be received normally, to the publisher. Furthermore, the publisher is configured to retransmit a chunk or sector designated by the repair message. Accordingly, when the same data is transmitted to a plurality of subscribers, data other than that for which retransmission is requested can be transmitted by single transmission. Therefore, it is possible to achieve high speed of communication and power saving. At the same time, it is possible to perform retransmission of data having failed to be received normally, and it is possible to prevent missing of data.

(Second Embodiment)

Next, the communication apparatus 1 according to a second embodiment is explained. The configuration of the communication apparatus 1 according to the second embodiment is identical to that of the first embodiment. Elements different from the first embodiment are explained below.

Figure 9:
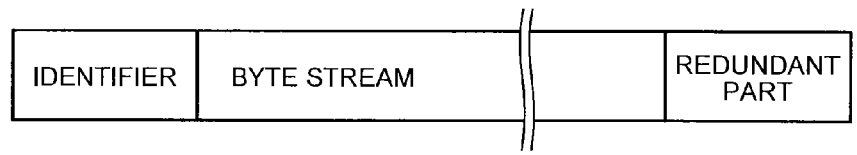
FIG. 9 is a diagram illustrating an example of a data structure of a chunk in a second embodiment.

FIG. 9 is a diagram illustrating an example of a data structure of a chunk in the second embodiment. While the first embodiment has explained an example in which a chunk includes a byte stream that is an entity of the chunk and an identifier of the chunk, in the second embodiment, the chunk also includes a redundant part along with these elements. The redundant part is redundant information (a redundant bit) that is calculated based on the contents of the chunk. The file management unit 22 or the message processing unit 23 of a publisher generates a redundant part by performing a predetermined process using the contents of the chunk (the identifier and byte stream of the chunk). The redundant part can be, for example, a value obtained by a simple system such as a checksum. Alternatively, in order to prevent falsifications, the redundant part can be generated using a hash function, from which it is difficult to detect different contents that become the same code value. The file management unit 22 or the message processing unit 23 of a subscriber determines whether reception of a chunk has been successful using the redundant part.

FIG. 9 illustrates an example in which an identifier of a chunk, a byte stream, and a redundant part are stored in this order; however, the order of storing is not limited thereto. Furthermore, as another example of FIG. 9, it is also possible that the byte stream as an entity of the chunk is used to generate redundant information and that the redundant information itself is used as the identifier of the chunk. Operations of the second embodiment other than those described above are identical to those of the first embodiment.

As described above, in the second embodiment, a publisher is configured to transmit chunks while including a redundant part used for error detection in the chunks. Accordingly, a subscriber can determine whether each of the chunks has been received normally using the redundant part.

(Third Embodiment)

Next, the communication apparatus 1 according to a third embodiment is explained. The configuration of the communication apparatus 1 according to the third embodiment is identical to that of the first embodiment. Elements different from the first embodiment are explained below.

In the third embodiment, it is assumed that a new subscriber can dynamically participate in a multicast group. A publisher can recognize the presence of a subscriber participating in a multicast group upon reception of a repair message; however, when there is no reception of a repair message, it is not possible to determine whether there is a subscriber participating in a multicast group. If the publisher can recognize the presence of a subscriber having newly participated in a multicast group, it is possible to perform an operation of retransmitting a series of data messages from the beginning for the subscriber, and a subscriber having participated in a multicast group in a loop transmission state can receive all of the series of data messages. However, a subscriber having newly participated in a multicast group does not receive any chunk until it receives a ToC, and thus the subscriber does not transmit any repair message.

Therefore, in the third embodiment, when a new subscriber has participated in a multicast group, the fact is notified to a publisher. While any method can be used for the method of notification, a method of notification by a ToC request message is explained below.

The ToC request message is a message that a subscriber having newly participated in a multicast group requests a publisher to transmit a ToC. The publisher can sense participation of the subscriber in the multicast group upon reception of the message. There is no restriction on the format of the ToC request message, and it suffices that the ToC request message is a message in which a value indicating that it is a ToC request set in advance is stored and its destination is the publisher (or a multicast address).

Figure 10:
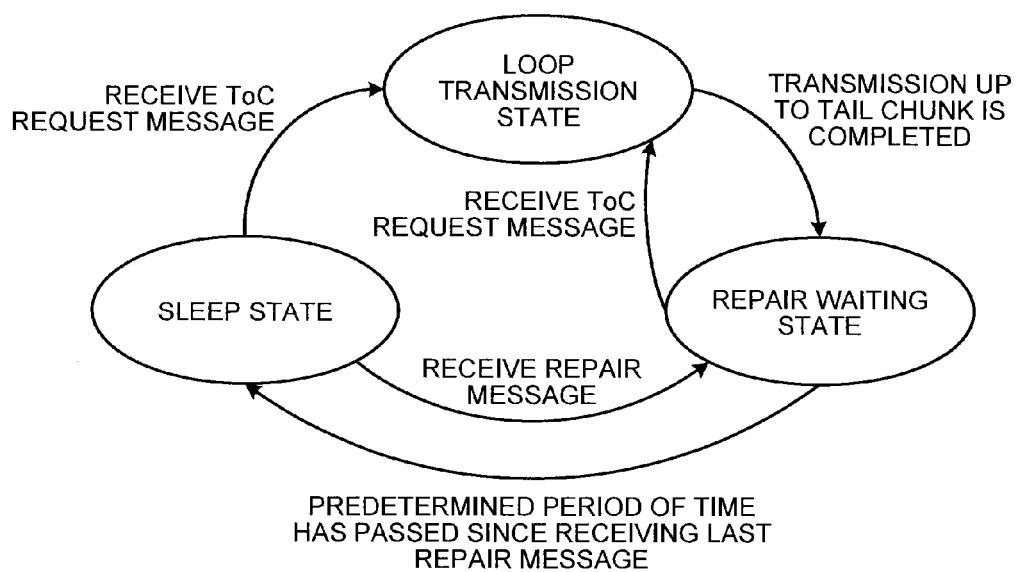
FIG. 10 is a diagram illustrating an example of a state transition of a publisher according to a third embodiment.

FIG. 10 is a diagram illustrating an example of a state transition of a publisher according to the third embodiment. At the time of starting an operation, the publisher is in a sleep state and is in a state of not transmitting a data message. In the sleep state, the publisher can be in a power-saving state as power supply to circuits that do not require power is interrupted. Upon reception of a ToC request message, the publisher in the sleep state shifts to a loop transmission state and transmits a ToC by a data message. Subsequently, the publisher transmits respective chunks to subscribers by the method described in the first embodiment or the method described in the second embodiment. When the publisher determines that all the chunks are delivered to all the subscribers (that is, a predetermined period of time has passed since receiving the last repair message), the publisher returns to the sleep state. Upon reception of the ToC request message, the publisher again shifts to the loop transmission state.

Meanwhile, when the publisher receives the ToC request message when it is in the loop transmission state, the transmission of chunks using a data message is temporarily stopped, and a ToC is transmitted by a data message. In this example, while it is assumed that a ToC request message is transmitted when a subscriber newly participates in a multicast group, it is also possible to configure that a ToC request message is transmitted even when reception of a data message is temporarily stopped and the reception of the data message is resumed later due to movement of a subscriber having already participated in a multicast group.

As described above, in the third embodiment, it has been explained that a ToC request message is transmitted when a subscriber newly participates in a multicast group. Accordingly, a publisher can recognize the presence of a subscriber participating in a multicast group, and thus effective transmission of messages can be achieved. Furthermore, by stopping transmission when there is no subscriber participating in a multicast group, power consumption can be reduced.

(Fourth Embodiment)

Next, the communication apparatus 1 according to a fourth embodiment is explained. The configuration of the communication apparatus 1 according to the fourth embodiment is identical to that of the first embodiment. Elements different from the first embodiment are explained below.

In the first embodiment, when a publisher receives a repair message, a chunk designated by a corresponding message is retransmitted. Meanwhile, there is a case where a plurality of subscribers individually transmits a transmission request of the same chunk as a repair message. In this case, if a publisher retransmits a chunk for each of received repair messages, the same chunk is retransmitted for many times and the repeated transmission causes redundant data transmission. When the number of the subscribers is large, the communication band for the data transmission may be compressed by the repair messages, and this may lead to performance degradation.

Therefore, in the fourth embodiment, as subscribers are configured to cooperate with each other, a representative one of the subscribers transmits a transmission request of the same chunk, thereby preventing redundant transmission of repair messages. For example, it is assumed that there are two subscribers, where a subscriber #1 is requesting transmission of chunks A, B, and C, and a subscriber #2 is requesting transmission of the chunks A and C. At this time, all the chunks requested by the subscriber #2 are included in the chunks requested by the subscriber #1, and thus it suffices that only the subscriber #1 transmits a repair message.

To realize such a cooperative operation, first, subscribers confirm availability of wireless resources to be used before transmitting a repair message (that is, a signal of a frequency band used for communication is not flowing on a space) and wait for a mutually random time, thereby preventing overlapping of repair message transmission timings of these subscribers. When the number of the subscribers is increased, the variation of the random waiting times needs to be greater so as to prevent such overlapping, and thus it is possible to employ a configuration of setting a standard deviation of a probability distribution that generates the random waiting times to be proportional to the number of subscribers belonging to the same multicast group (an estimate of the number of subscribers). For example, it is possible to employ a configuration in which a publisher holds, as a list, identifiers of the communication apparatus 1 as a transmission source included in repair messages received from subscribers belonging to the same multicast group during a predetermined period of time in the past, and then the number of identifiers of the communication apparatus 1 included the list, from which the number of overlapping repair messages is deleted, is set to be the estimate of the number of subscribers. Next, the subscribers analyze received repair messages from other apparatuses. Specifically, in the fourth embodiment, the wireless interface 4 passes to the message processing unit 23 not only messages addressed to the interface itself but also messages addressed to a publisher of a multicast group to which the interface itself belongs. Thereafter, the message processing unit 23 extracts chunk identifiers stored in repair messages transmitted from other subscribers and holds the extracted chunk identifiers as a requested chunk list. Subsequently, when it is a time for the subscriber itself to transmit a repair message, a repair-message transmission process shown in FIG. 11 (described below) is performed. The message processing unit 23 of each of the subscribers holds chunk identifiers of chunks that the subscribers themselves request their retransmission as a requesting chunk list.

Figure 11:
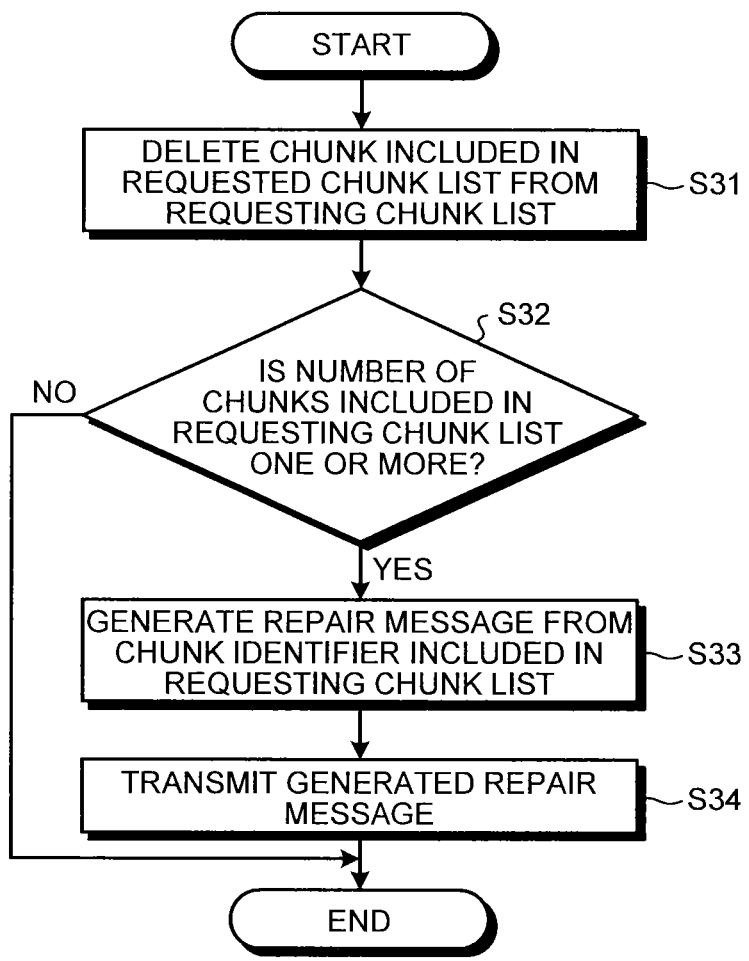
FIG. 11 is a diagram illustrating an example of a transmission process procedure of a repair message according to a fourth embodiment.

FIG. 11 is a diagram illustrating an example of a transmission process procedure of a repair message according to the fourth embodiment. The message processing unit 23 of a subscriber deletes chunk identifiers included in a requested chunk list from a requesting chunk list (Step S31). Next, it is determined whether the number of the chunk identifiers included in the requesting chunk list is one or more or none (Step S32), and when the number is one or more (Yes at Step S32), a repair message having stored therein chunk identifiers included in the requesting chunk list is generated (Step S33). The wireless interface 4 then transmits the repair message (Step S34). When no chunk identifier is included in the requesting chunk list (No at Step S32), a repair message is not transmitted and the process is ended.

As described above, in the fourth embodiment, when a chunk for which the subscriber itself is to request retransmission has already been requested to be retransmitted by another subscriber by a repair message, the chunk is deleted from items for which retransmission is requested by a repair message. Accordingly, repair messages that request overlapping chunk retransmission can be reduced and an unnecessary traffic increase can be suppressed.

(Fifth Embodiment)

Next, the communication apparatus 1 according to a fifth embodiment is explained. The configuration of the communication apparatus 1 according to the fifth embodiment is identical to that of the first embodiment. Elements different from the first embodiment are explained below.

In the first embodiment, upon reception of a repair message in a loop transmission state, a publisher temporarily stops an operation of sequentially transmitting chunks and transmits requested chunks by a data message. When transmission of a large number of chunks is requested by a repair message, the sequential transmitting operation of chunks performed by the publisher becomes slow, and the publisher becomes busy to handle the repair message. It is not desirable to delay data transmission to many other subscribers due to handling of a repair message from a certain subscriber.

In the fifth embodiment, to avoid such circumstances, when a publisher is in a loop transmission state, repair messages meeting a certain condition are ignored (any response to these repair messages is not made, that is, chunks requested by the repair messages are not transmitted). When a requested chunk is not delivered since a predetermined period of time has passed after transmitting a repair message, the same repair message is transmitted again. Therefore, if the repair message is ignored, the reachability of data is guaranteed.

As an example, there is a method such that a publisher ignores a repair message requesting a chunk, where the repair message has been transmitted by a data message and by the publisher itself within a predetermined period of time in the past. This method is applied because, when a certain chunk has been transmitted by a data message in the immediate past, depending on the timing of transmitting the repair message, a subscriber having transmitted a repair message corresponding to the chunk has the chunk already delivered thereto. In other words, when a plurality of repair messages requesting the same chunk are delivered consecutively within a predetermined period of time, it suffices to respond only to the first repair message, and responding to the subsequent repair messages causes generation of a redundant data message.

Furthermore, as another condition for ignoring a repair message, the number of requested chunks included in the message can be mentioned. For example, when the number of requested chunks is larger than a threshold, a publisher does not respond to the repair message.

As described in the first embodiment, when chunks up to the tail chunk are transmitted, the state of the publisher shifts to a loop transmission state to a standby state. In the standby state, repair messages are not ignored and even repair messages requesting a large number of chunks are processed. Therefore, ultimately, it is guaranteed that all chunks are delivered to subscribers having transmitted ignored repair messages.

As another applicable example other than the number of requested chunks, the number of subscribers requesting these chunks can be mentioned. For example, a publisher counts the number of subscribers as transmission sources of repair messages requesting the same chunk, where the repair messages are received within a predetermined period of time, and the counted number is set as the number of subscribers requesting retransmission of respective chunks. Subsequently, when the number of subscribers requesting retransmission of chunks is larger than a predetermined number, the publisher responds to the repair messages, and does not respond to these messages when the number of subscribers requesting retransmission of chunks is equal to or smaller than a predetermined number.

Furthermore, the number of times of being ignored can be applicable. For example, when a subscriber has not been able to receive a chunk requested by a repair message after transmitting the repair message, it is determined that the repair message has not been responded (has been ignored). Subsequently, when the repair message is retransmitted, it is transmitted with the number of times the repair message has been ignored. It is possible to employ a method in which, as for messages that have been ignored for the number of times that is more than a predetermined number of times, a publisher forcibly responds to these messages even if other conditions (conditions to ignore) are met.

Figure 12:
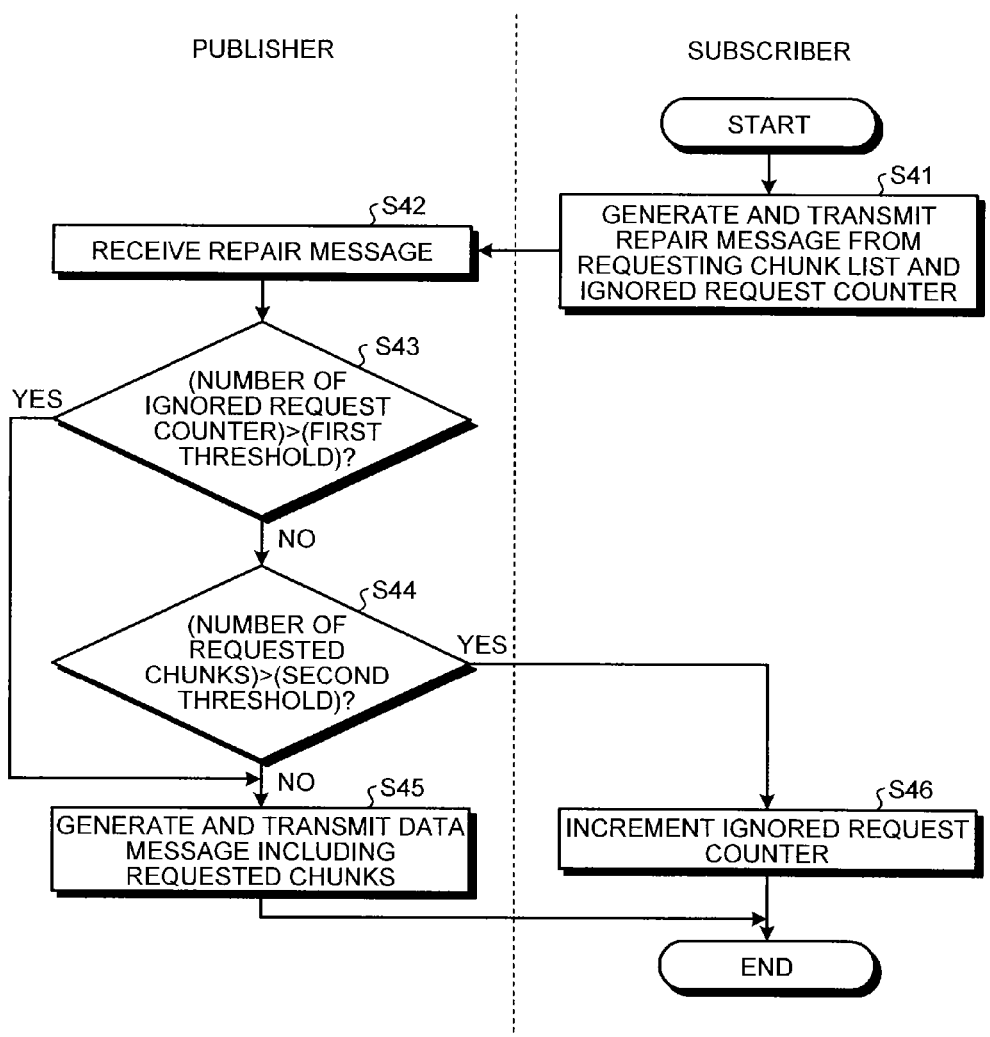
FIG. 12 is a diagram illustrating an example of a process of determining whether to ignore a repair message.

It is also possible to employ a method in which a publisher determines whether to ignore a repair message by combining two or more conditions. FIG. 12 is a diagram illustrating an example of a process of determining whether to ignore a repair message in a case of using both the number of requested chunks and the number of times of being ignored. As shown in FIG. 12, a subscriber counts the number of times that the same repair message is ignored by an ignored request counter, and then generates and transmits a repair message having stored therein the counted number as an ignored request number (Step S41). When a publisher receives the repair message (Step S42), the publisher determines whether the ignored request number stored in the repair message is larger than a first threshold (Step S43). When the ignored request number is equal to or smaller than the first threshold (No at Step S43), it is determined that the number of requested chunks is larger than a second threshold (Step S44). When the number of requested chunks is equal to or smaller than the second threshold (No at Step S44), the publisher generates and transmits a data message including chunks requested by the repair message (Step S45).

When the ignored request number is larger than the first threshold (Yes at Step S43), the process proceeds to Step S45. When the number of requested chunks is larger than the second threshold (Yes at Step S44), the subscriber does not transmit a repair message. Accordingly, because the subscriber cannot receive a data message corresponding to the repair message, the subscriber determines that the repair message has been ignored, and increments the ignored request counter (Step S46).

As described above, in the fifth embodiment, when a publisher is in a loop transmission state and a certain condition is met, the publisher is configured not to transmit chunks requested by a repair message even when the publisher receives the repair message. Accordingly, it is possible to prevent delay of data transmission to subscribers.

(Sixth Embodiment)

Next, the communication apparatus 1 according to a sixth embodiment is explained. The configuration of the communication apparatus 1 according to the sixth embodiment is identical to that of the first embodiment. Elements different from the first embodiment are explained below.

In the first embodiment, as transmission of all chunks is ended, the state of a publisher shifts from a loop transmission state to a repair reception state. In the repair reception state, the publisher does not dynamically transmit any data message, and transmits chunks only in a case of responding to repair messages delivered from subscribers.

However, when there is a subscriber that has not received a large number of chunks after ending loop transmission, it might cause performance degradation. This is because, in this case, such a subscriber transmits a large-sized repair message including a large amount of chunk identifiers. Such a large-sized repair message causes occupation of a certain wireless band, and causes an increase of traffic volume. When there is a limitation of the size of the repair message, because a large number of repair messages that are divided to be in a certain size are transmitted, an increase of traffic volume is caused similarly to the above case. Such circumstances happen particularly when there is a subscriber with a poor reception condition.

Therefore, in the sixth embodiment, a status message is newly added as a message that can be transmitted by a subscriber. The status message has stored therein a reception progress status of the subscriber. As a simplest format of the status message, the number of chunks already received by a subscriber is stored in the status message. The subscriber transmits the status message at a predetermined time interval. Furthermore, in the status message, the reception state of respective chunks is notified with a bit-map format, and if all the chunks have been already received, a bit can be set (as 1, for example), and if these chunks have not been received yet, the bit can be cleared.

As transmission of all chunks is ended, a publisher analyzes a received status message and obtains a minimum value of a ratio of received chunks before shifting to a repair reception state. The ratio of received chunks is a value obtained by dividing the number of chunks received by a subscriber by the number of chunks transmitted by a publisher. The number of received chunks can be used instead of the ratio of received chunks. When the minimum value of the ratio of received chunks is smaller than a threshold, the state of the publisher does not shift to a repair reception state and it is maintained as a loop transmission state. The publisher maintaining a loop transmission state again sequentially transmits chunks from the top chunk by a data message. When a loop transmission state is maintained, retransmission of chunks is performed without using any repair message, and thus it is possible to suppress generation of a considerably large-sized repair message by a subscriber with a small ratio of received chunks. However, in this case, it is necessary to suppress generation of a large-sized repair message also on the subscriber side based on the reception progress status of the subscriber itself. Specifically, when there are unreceived chunks, there is a possibility that reception of the unreceived chunks can be made due to transmission of the next top chunk from a publisher. Accordingly, for example, based on a ToC, it is determined whether the unreceived chunks are chunks that are predicted to be receivable if the subscriber waits for a predetermined period of time, and as for the chunks predicted to be receivable if the subscriber waits for a predetermined period of time, a repair message therefor is not transmitted.

Furthermore, in a repair reception state, the publisher also analyzes status messages delivered by subscribers, and when the publisher detects a ratio of received chunks that is smaller than a threshold, the state of the publisher shifts to a loop transmission state. For example, because the ratio of received chunks of a subscriber having newly participated in a multicast group is 0, the publisher can start sequential distribution of all chunks to such a subscriber.

As described above, in the sixth embodiment, a subscriber notifies a reception state of chunks to a publisher by a status message, and when the publisher determines that there is a subscriber that has not received a large amount of chunks based on the status message, the state of the publisher does not shift to a repair reception state and it is maintained as a loop transmission state. Accordingly, it is possible to prevent an increase of traffic volume due to a large amount of repair messages.

(Seventh Embodiment)

Next, the communication apparatus 1 according to a seventh embodiment is explained. The configuration of the communication apparatus 1 according to the seventh embodiment is identical to that of the first embodiment. Elements different from the first embodiment are explained below.

In the first embodiment, the destination of repair messages is a publisher and only the publisher retransmits chunks. Meanwhile, when there is a plurality of subscribers that participates in a multicast group, there is a case where a chunk requesting retransmission of a certain subscriber is normally received and held by another adjacent subscriber. In this case, in the seventh embodiment, effective use of wireless resources is realized by retransmitting chunks from another subscriber.

Specifically, in the seventh embodiment, in the repair message format shown in FIG. 3, a repair message in which the destination of the second item is changed to a multicast address is used. Alternatively, it is also possible to employ a configuration in which the repair message format shown in FIG. 3 is unchanged and respective subscribers also receive a repair message addressed to a publisher and perform the following processing.

When a subscriber receives a repair message from another subscriber, it is determined that the subscriber itself holds chunks requested by the repair message. The determination is made by the message processing unit 23, for example. When the message processing unit 23 holds at least one of the chunks requested by the repair message, the message processing unit 23 generates a data message having stored therein the held chunk and transmits the data message to the subscriber as the transmission source of the repair message via the wireless interface 4. The destination of the data message is the subscriber as the transmission source of the repair message. When the message processing unit 23 does not hold even one of the chunks requested by the repair message, the repair message is not responded to.

Figure 13:
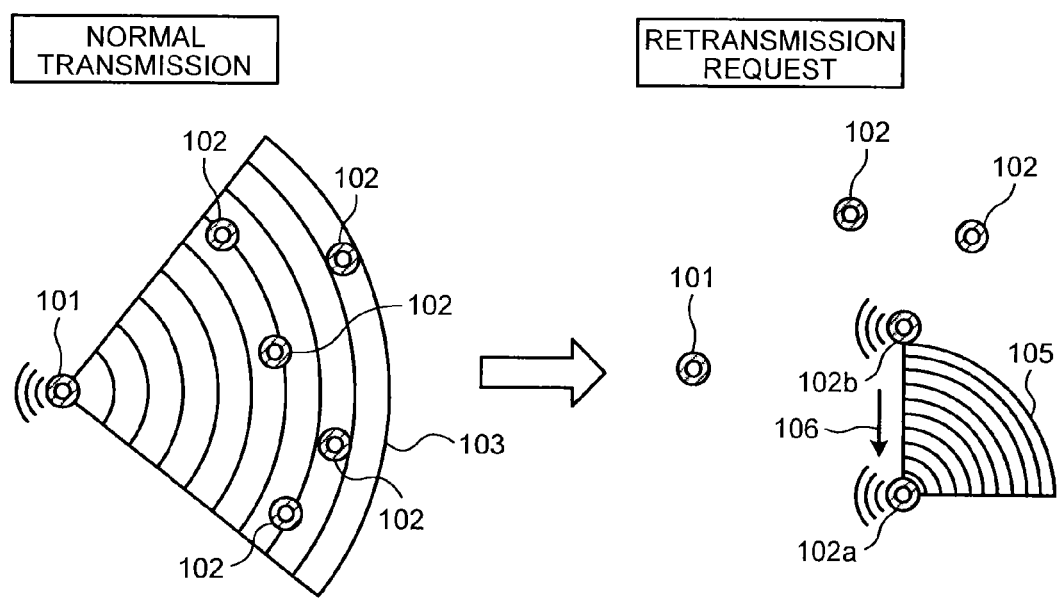
FIG. 13 is a diagram illustrating an example of message transmission in a seventh embodiment.

FIG. 13 is a diagram illustrating an example of message transmission in the seventh embodiment. The normal transmission on the left side of FIG. 13 represents a state where the publisher 101 transmits a data message by multicast. The data message reaches subscribers 102a, 102b, and 102c that are positioned within the reachable area 103 of a radio wave from the publisher 101. It is assumed that the subscriber 102a can receive chunks transmitted by a data message normally, and the subscriber 102b has not been able to receive a part of the chunks normally. The subscriber 102b transmits a repair message. A reachable area 105 of a radio wave on the right side of FIG. 13 represents a reachable area of the repair message transmitted by the subscriber 102b. In FIG. 13, while the reachable area 105 of a radio wave of the subscriber 102b is illustrated to be smaller than the reachable area 103 of a radio wave from the publisher 101 for the sake of simplicity of the drawing, an actual reachable area of a radio wave can be different from that of the reachable area 105 shown in FIG. 13. For example, the reachable area 105 of a radio wave can be equal to the reachable area 103 of a radio wave from the publisher 101, and there is no restriction on the reachable area 105 of a radio wave. When the subscriber 102a receives a repair message from the subscriber 102b, if the subscriber 102a normally receives chunks for which retransmission is requested by a repair message, the subscriber 102a transmits a data message 106 having stored therein these chunks. The radio wave output from the publisher 101 or the subscribers 102a, 102b, and 102c can be either a radio wave having directionality or that without directionality. When the radio wave does not have directionality, in FIG. 13, the radio wave output from the publisher 101 or the subscribers 102a, 102b, and 102c propagates in a concentric manner.

The process in which a subscriber generates a data message based on a received repair message and transmits the data message is identical to the process of the publisher. For example, while a condition for a case where a publisher ignores a repair message has been explained in the fifth embodiment, subscribers can also ignore a repair message with a condition identical to that for a publisher.

In the seventh embodiment, when a plurality of communication apparatuses 1 (publishers or subscribers) simultaneously receive one repair message, there is a possibility that each of the plurality of communication apparatuses 1 transmits a data message having stored therein mutually the same chunk. This leads to redundant data transmission and causes a traffic increase. Therefore, to prevent a redundant message from being generated, it is possible to use a method identical to that of suppressing transmission of redundant repair messages described in the fourth embodiment, that is, a method of waiting for a random time before transmitting a data message. Subsequently, data messages transmitted by other communication apparatuses 1 are also analyzed, and chunks transmitted by those communication apparatuses 1 within a predetermined period of time in the past are not transmitted. To realize this process, for example, each of the communication apparatuses 1 hold chunk identifiers of chunks transmitted by other communication apparatuses 1 by a data message within a predetermined period of time in the past as a transmitted chunk list. When it is a time for the apparatus itself to transmit a data message, as shown in FIG. 14, a transmission process of the data message is performed.

Figure 14:
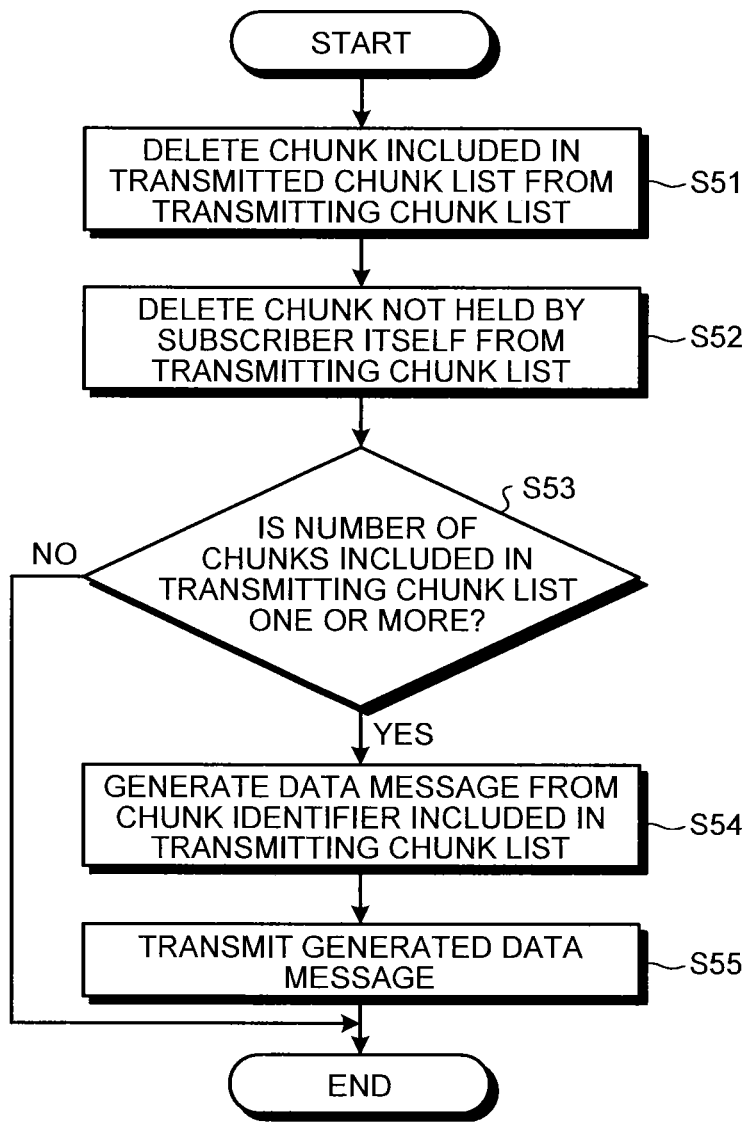
FIG. 14 is a diagram illustrating an example of a transmission process procedure of a data message in the seventh embodiment.

FIG. 14 is a diagram illustrating an example of a transmission process procedure of a data message in the seventh embodiment. In this example, while a transmission process procedure of a data message of a subscriber has been explained, a publisher also performs a transmission process identical to that of a subscriber when the publisher transmits a data message for retransmission. The message processing unit 23 of a subscriber deletes chunks (in practice, chunk identifiers) included in a transmitted chunk list from a transmitting chunk list (Step S51).

The message processing unit 23 of a subscriber deletes chunks not held by the subscriber itself from the transmitting chunk list (Step S52). Next, the message processing unit 23 of a subscriber determines whether chunks are included in the transmitting chunk list (Step S53), and when one or more chunk identifiers are included in the transmitting chunk list (Yes at Step S53), the message processing unit 23 generates a data message having stored therein chunks corresponding to chunk identifiers included in the transmitting chunk list (Step S54). The wireless interface 4 of the subscriber transmits a data message (Step S55). When no chunk identifier is included in the transmitting chunk list (No at Step S53), transmission of a data message corresponding to the repair message is not performed and the process is ended.

In the seventh embodiment, a subscriber transmits a data message only when it responds to a repair message. The subscriber performs operations passively with regard to transmission of a data message without being set in a loop transmission state like a publisher is, that is, without transmitting chunks dynamically.

As described above, in the seventh embodiment, when a subscriber having received a repair message also holds a chunk requested by a repair message, it is configured that the subscriber transmits a data message having the chunk stored therein. Accordingly; when a subscriber having requested retransmission of data has another subscriber holding the requested chunk nearby, the subscriber can receive a data message from the nearby subscriber. Furthermore, because a retransmission process of data can be shared by subscribers, it is possible to avoid a situation such that only a publisher is overloaded and the power consumption of the publisher is increased.

While a plurality of embodiments has been explained above, it is possible to combine and carry out two or more of these embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus comprising:
   a wireless interface circuit that performs transmission and reception of a message with outside of the communication apparatus;
   an operation-mode storing memory that stores information related to an operation mode of the communication apparatus, the operation mode including a publisher mode and a subscriber mode;
   an identification-information storing memory that stores a first identifier indicating that the communication apparatus belongs to a first group;
   a message processing circuit that generates a message that is transmitted by the wireless interface circuit, and analyzes a message that is received by the wireless interface circuit; and
   a nonvolatile memory, wherein
   when the communication apparatus is determined to be a publisher based on a mode stored in the operation-mode storing memory, the message processing circuit generates a transmission message including the first identifier to be output by the wireless interface circuit to outside of the communication apparatus, and
   when the communication apparatus is determined to be a subscriber based on a mode stored in the operation-mode storing memory, the message processing circuit analyzes whether a reception message received by the wireless interface circuit includes the first identifier, and stores data included in the message when the first identifier is included in the reception message, and does not store data included in the message when the first identifier is not included in the reception message.

2. The communication apparatus according to claim 1, wherein the reception message includes a plurality of data chunks and the communication apparatus, when the communication apparatus is a subscriber, outputs a first repair message including one or more identifiers of data chunks having failed to be received among the plurality of data chunks included in the reception message.

3. The communication apparatus according to claim 2, wherein the first repair message is transmitted to the publisher with an identifier of the publisher.

4. The communication apparatus according to claim 2, wherein when the communication apparatus is a publisher, upon reception of a second repair message, the message processing circuit generates a transmission message including a data chunk corresponding to an identifier included in the second repair message and outputs a generated message to outside of the communication apparatus by the wireless interface circuit.

5. The communication apparatus according to claim 2, wherein when the communication apparatus is a subscriber, a data chunk included in a reception message is stored in the nonvolatile memory, and when a second repair message is received, in a case where a data chunk corresponding to an identifier included in the second repair message is stored in the nonvolatile memory, a transmission message including the data chunk is generated and a generated message is output to the wireless interface circuit.

6. The communication apparatus according to claim 2, wherein the message processing circuit holds a data identifier indicating the data chunks stored in a message received within a predetermined period of time in the past as received data information, and when a message that is transmitted as a response from the communication apparatus to a second repair message is generated, a message, which has stored therein the data chunks other than the data chunks corresponding to a data identifier among the data chunks for which retransmission is requested by the second repair message included in the received data information, is generated.

7. The communication apparatus according to claim 6, wherein, upon confirmation of availability of wireless resources to be used, after waiting for a random time, a message transmitted as a response to a repair message is transmitted.

8. The communication apparatus according to claim 2, wherein when the communication apparatus is a subscriber, the message processing circuit holds retransmission-data identification information indicating the data chunks for which retransmission is requested by a repair message received from another subscriber, and when a second repair message transmitted from the communication apparatus is generated, the second repair message requests retransmission of the data chunks other than the data chunks corresponding to a data identifier included in the retransmission-data identification information among the data chunks for which retransmission is requested by the communication apparatus.

9. The communication apparatus according to claim 7, wherein
a standard deviation of a probability distribution for generating the random time is set to be proportional to the number of subscribers belonging to the first group,
when the communication apparatus is a subscriber, an identifier of the communication apparatus as a transmission source is stored in a repair message, and
when the communication apparatus is a publisher, the communication apparatus holds identifiers of a subscriber as a transmission source included in a repair message received within a predetermined period of time in the past from a subscriber belonging to the first group as a first list, and the number of identifiers included in a second list, from which redundant identifiers are deleted from the first list, is used as the number of the subscribers.

10. The communication apparatus according to claim 2, wherein when the communication apparatus is a publisher, a state of the communication apparatus shifts from a loop transmission state in which the data chunks generated by a series of data are stored in a message in a predetermined order to a repair reception state in which as transmission of a predetermined number of the data chunks generated by the series of data is ended and when a second repair message is received, the data chunks for which retransmission is requested by the second repair message are transmitted.

11. The communication apparatus according to claim 10, wherein when the communication apparatus is a subscriber, a status message having stored therein the number of the received data chunks is transmitted regularly at a predetermined period of time.

12. The communication apparatus according to claim 11, wherein when the communication apparatus is a publisher, as transmission of the series of data is ended, before shifting to a repair reception state, the number of the received data chunks stored in a received status message is extracted, a minimum value of the number of the extracted received data chunks is obtained, and when the minimum value is equal to or smaller than a threshold, a loop transmission state is maintained.

13. The communication apparatus according to claim 11, wherein when the communication apparatus is a publisher, as a status message is received in a repair reception state, the number of the received data chunks stored in a received status message is extracted, and when the number of the extracted received data chunks is equal to or smaller than a threshold, the communication apparatus shifts to a loop transmission state.

14. The communication apparatus according to claim 10, wherein when the communication apparatus is a publisher, in the loop transmission state, as a third repair message is received, in a case where a certain condition is determined to be met, transmission of the data chunks is continued in the predetermined order and retransmission of the data chunks for which retransmission is requested by the third repair message is not performed.

15. The communication apparatus according to claim 14, wherein when the communication apparatus has transmitted all the data chunks for which retransmission is requested by a received repair message within a predetermined period of time in the past, the certain condition is determined to be met.

16. The communication apparatus according to claim 14, wherein when the number of the data chunks for which retransmission is requested by a received repair message exceeds a threshold, the certain condition is determined to be met.

17. The communication apparatus according to claim 14, wherein
when the communication apparatus is a subscriber, in a case where a message including the data chunks for which retransmission is requested by a fourth repair message is not received within a predetermined period of time after transmitting the fourth repair message, it is determined that there is no response to the fourth repair message, and a counted number of determining that there is no response at a time of retransmitting the fourth repair message is stored in the fourth repair message and the fourth repair message is transmitted, and
when the communication apparatus is a publisher, in a case where the counted number of determining that there is no response stored in a received repair message exceeds a threshold, even when the certain condition is determined to be met, the data chunks for which retransmission is requested by the received repair message is stored in a message and the message is transmitted.

18. The communication apparatus according to claim 14, wherein when the communication apparatus is a publisher, based on a received repair message, the number of subscribers requesting retransmission of corresponding data chunks for each of the data chunks for which retransmission is requested by a repair message is counted, and when a counted number of subscribers exceeds a threshold, even when the certain condition is determined to be met, the data chunks are stored in a message and the message is transmitted.

19. The communication apparatus according to claim 10, wherein when the communication apparatus is a publisher, before transmitting the series of data, a contents information message having stored therein identifiers of the data chunks corresponding to the series of data is transmitted, and when the communication apparatus is a subscriber, a contents-information requesting message for requesting transmission of the contents information message is transmitted.

20. The communication apparatus according to claim 1, wherein when the communication apparatus is a publisher, redundant information for error detection is generated using data chunks, and the redundant information is stored in a message that transmits the data chunks and is transmitted.

21. The communication apparatus according to claim 1, wherein when the communication apparatus is a publisher, the first identifier of the first group is set where the first group itself becomes a publisher, and the first identifier is transmitted to other apparatuses, and when the communication apparatus is a subscriber, in a case where the communication apparatus participates in the first group, the communication apparatus stores the received first identifier in the identification-information storing memory.

22. A communication method in a communication apparatus including a nonvolatile memory, comprising:
storing information related to an operation mode of the communication apparatus, the operation mode including a publisher mode and a subscriber mode; and storing a first identifier indicating that the communication apparatus belongs to a first group, wherein when the communication apparatus is determined to be a publisher based on a stored mode, the communication apparatus generates a transmission message including the first identifier to be output as a wireless signal to outside of the communication apparatus, and when the communication apparatus is determined to be a subscriber based on a stored mode, the communication apparatus analyzes whether a reception message includes the first identifier, and stores data included in the reception message when the first identifier is included in the reception message, and does not store data included in the reception message when the first identifier is not included in the reception message.

* * * * *